United States Patent [19]

Glowaky et al.

[11] 4,254,250
[45] Mar. 3, 1981

[54] AMINE POLYMERS HAVING DEWATERING ACTIVITY

[75] Inventors: Raymond C. Glowaky, Niantic; Steven R. Kurowsky; Robert J. Sysko, both of East Lyme, all of Conn.

[73] Assignee: Pfizer Inc., New York, N.Y.

[21] Appl. No.: 965,770

[22] Filed: Dec. 4, 1978

[51] Int. Cl.³ .......................... C08F 8/32; C08F 26/06
[52] U.S. Cl. ..................................... 525/350; 525/329; 525/336; 525/343; 525/352; 525/354; 525/382; 526/258
[58] Field of Search ....................... 526/30, 37, 38, 41, 526/16, 23; 525/329, 336, 343, 350, 351, 352, 354, 382

[56] References Cited

U.S. PATENT DOCUMENTS 3,406,139  10/1968  Hurwitz ............................... 260/29.6
3,647,769  3/1972   Bufton ................................. 526/23 X
4,041,006  8/1977   Fong ................................... 526/23 X Primary Examiner—C. A. Henderson
Attorney, Agent, or Firm—Francis X. Murphy; Charles J. Knuth; Peter C. Richardson

[57] ABSTRACT

Amine polymers are used to dewater suspensions of particulate matter in water. The polymers are synthesized by the reaction of a nitrile polymer such as polyacrylonitrile, an aminating agent, and a sulfur activator. The dewatering properties of these amine polymers can be beneficially employed to treat sewage sludge, silt laden water, industrial waste and the like.

4 Claims, No Drawings

AMINE POLYMERS HAVING DEWATERING ACTIVITY

BACKGROUND OF THE INVENTION

Purification of municipal or industrial waste, silted water or aqueous suspensions of particulate material is complicated by the presence of colloids, slow settling material, industrial waste, variations in the pH, a range of hydrophilic to hydrophobic material and large volumes of effluent. Agents to agglomerate, aggregate, adhere, cohere, congeal, concrete, consolidate, deposit, flocculate, precipitate or dewater the solid material in such waste are known. Early efforts used inorganic salts as such agents but more recently, organic polymers have been employed with success. The active types are thought to exist as a chain of sites to which the suspended solids adhere producing an easily filterable, large mass particle. Some important polymer flocculation or dewaterant agents are described in the following patents: U.S. Pat. No. 3,752,760, U.S. Pat. No. 3,647,769, U.S. Pat. No. 3,300,406, U.S. Pat. No. 3,228,707 and U.S. Pat. No. 3,406,139.

Art recognized flocculating or dewatering agent polymers often have complex, poorly defined structures and are synthesized from a number of ingredients. For example one such polymer is the reaction product of polyacrylonitrile, N,N-dimethyl-1,3-propanediamine and water (U.S. Pat. No. 3,647,769). Others are polymers of 1-vinylimidazoline, 1-vinyltetrahydropyrimidine or N-(methylaminopropyl) acrylamide which are formed by reaction of polyacrylonitrile and ethylenediamine, 1,3-propanediamine, N-methyl-1,3-propanediamine or N-methylpropanediamine respectively in the presence of sulfur (U.S. Pat. No. 3,406,139). In general these agents possess low dewaterant activity compared to the amine polymers of the present invention.

SUMMARY OF THE INVENTION

In accordance with the invention, an amine polymer having flocculating and dewatering properties is formed by a condensation reaction of a nitrile polymer such as polyacrylonitrile or a copolymer of acrylonitrile monomer and another ethylenically unsaturated comonomer, a sulfur activator and an aminating agent which is an N,N-disubstituted-alkanediamine or a mixture of such a diamine and ethylenediamine. The amine polymer is characterized by its complete solubility in water and its chromophoric U.V. absorption. It may also be in the form of the mineral acid salt, organic acid salt or quaternary ammonium salt.

The nitrile polymer used as a first ingredient to make the amine polymer may be selected from polyacrylonitrile or a copolymer of at least about 30 mole percent acrylonitrile monomer with the remainder being an ethylenically unsaturated comonomer. The comonomer, in turn, may be selected from acrylic acid, alkyl acrylate, methacrylic acid, methacrylonitrile, alkyl methacrylate, acrylamide, N,N-dialkylacrylamide, methacrylamide, N,N-dialkylmethacrylamide, alkyl vinyl ketone, styrene, and alkyl crotonate wherein each of the alkyl substituents mentioned has from one to four carbon atoms. The molecular weight range varies according to the type of nitrile polymer used. Polyacrylonitrile must have an average molecular weight within a range of from about 150 thousand to about 5 million. Copolymers must have an average molecular weight within a range of from about 50 thousand to about 3 million.

The aminating agent used as a second ingredient to make the amine polymer is present in the amount of about 1 to 20 molar equivalents per molar equivalents of nitrile groups present in the nitrile polymer. It may be an N,N-(di-n-alkyl)-1,omega-n-alkanediamine having from one to five carbon atoms in each of the alkyl groups and having from two to six carbons in the n-alkane group, N-(3-aminopropyl)morpholine or N-(3-aminopropyl)piperidine or the agent may be a mixture of about 30 to 70 mole percent N,N-(di-n-alkyl)-1,omega-n-alkanediamine as defined above and about 70 to 30 mole percent ethylenediamine.

The sulfur activator used as a third ingredient to make the amine polymer may be selected from a wide range of sulfur containing compounds including sulfur, hydrogen sulfide, and organosulfur compounds having at least a mercapto, thiocarbonyl, thioamide or thiocarboxylic acid group.

The amount of sulfur activator present is at least about 1 weight percent as measured by the proportion of contained sulfur present in the activator relative to the weight of the nitrile polymer.

The amine polymer formed during the condensation reaction is conditioned by its exposure to water at any time during its formation, work-up and isolation, storage or use. The conditioning tends to be of partial benefit to use.

As set out supra, an embodiment of the amine polymer is the water-conditioned condensation product wherein the aminating agent is N,N-(di-n-alkyl)-1,omega-n-alkanediamine, N-(3-aminopropyl)morpholine or N-(3-aminopropyl)-piperidine. Another embodiment is the water-conditioned condensation product wherein the aminating agent is a mixture of N,N-(di-n-alkyl)-1,omega-n-alkanediamine and ethylenediamine.

A preferred embodiment of the amine polymer is the water-conditioned condensation product of polyacrylonitrile or a copolymer of acrylonitrile and a comonomer such as acrylic acid, ethyl acrylate, methyl methacrylate or acrylamide; sulfur; and N-N-dimethyl-1,3-propanediamine or N,N-dimethyl-1,2-ethylenediamine.

Another preferred embodiment of the amine polymer is the water-conditioned condensation product of polyacrylonitrile or a copolymer of acrylonitrile and acrylic acid, ethyl acrylate, methyl methacrylate or acrylamide; sulfur; and a mixture of N,N-dimethyl-1,3-propanediamine and ethylenediamine.

Especially preferred embodiments of the amine polymer are as follows:

the water-conditioned condensation product of polyacrylonitrile, 5 to 8 molar equivalents of N,N-dimethyl-1,3-propanediamine, and 6 to 10 weight percent sulfur;

the water-conditioned condensation product of polyacrylonitrile, 5 to 8 molar equivalents of N,N-dimethyl-1,2-ethylenediamine, and 6 to 10 weight percent sulfur; and the water-conditioned condensation product of polyacrylonitrile, 5 to 8 molar equivalents of a mixture of about 45 to 60 mole percent N,N-dimethyl-1,3-propanediamine and about 55 to 40 mole percent ethylenediamine, and 4 to 10 weight percent sulfur.

The process of the invention consists of certain reaction conditions that substantially preserve the length of the hydrocarbon "backbone" of the amine polymer by minimizing its degradation during the reaction. This minimization is largely responsible for the superior dewaterant activity of the invention with respect to the prior art dewaterants.

The invention also includes a method to treat an aqueous system containing finely divided, suspended particulate material using an amine polymer of the present invention or its salt so that the suspended particles are dewatered. The method requires addition of the above described amine polymer or its salt to an aqueous suspension of finely divided, particulate material using about 0.1 to 5 weight percent of the amine polymer or its salt relative to the dry weight of the particulate material present.

DETAILED DESCRIPTION OF THE INVENTION

In accordance with the invention, an amine polymer in synthesized by the condensation of a nitrile polymer, an aminating agent, and a sulfur activator. The first ingredient the nitrile polymer, forms the hydrocarbon backbone of the amine polymer and the variation of its molecular weight affects the dewaterant activity of the amine polymer. In general an amine polymer must be formed from a nitrile copolymer having approximately 50 thousand to about 3 million average molecular weight or from polyacrylonitrile having approximately 150 thousand to 5 million average molecular weight. It will have superior dewaterant activity compared to art recognized dewatering agents provided that a nitrile polymer whose average molecular weight lies within these ranges is used.

The aminating agent is the ingredient that will form the majority of the adherence sites appended to the amine polymer hydrocarbon backbone. In the course of the condensation of the nitrile polymer with the aminating agent, the sites are formed by nucleophilic attack of the primary amine group or groups of the agent upon one or more nitrile groups of the nitrile polymer. The N,N-disubstituted alkanediamine and related types of aminating agents will form tertiary amine moieties while the aminating agent composed of a mixture will form both tertiary amine moieties and heterocyclic rings.

Sulfur contained in the sulfur activator is incorporated into the amine polymer and in this respect the activator is a reactant. It also serves another more important function; it facilitates the amination reaction most likely by increasing the reaction rate at lower temperatures. This catalytic nature essentially prevents degradation, allows substantial preservation of the maximum chain length of the nitrile polymer starting material and promotes the reaction of a high proportion of nitrile groups.

The structure of the amine polymers of the present invention consists of a series of chemical moieties appended to the hydrocarbon backbone. It is believed that when the appropriate aminating agents are used, the corresponding appropriate moeities pictured infra will be present, R being N,N-(di-n-alkyl)aminoalkyl having 1 to 5 carbon atoms in each of the di-n-alkyl groups and 2 to 6 carbons in the alkyl group, 4-morpholinopropyl or 1-piperidinopropyl. In addition other moieities including those containing sulfur groups such as thioamide, polysulfide and mercaptan may also form part of the constitution of the amine polymer.

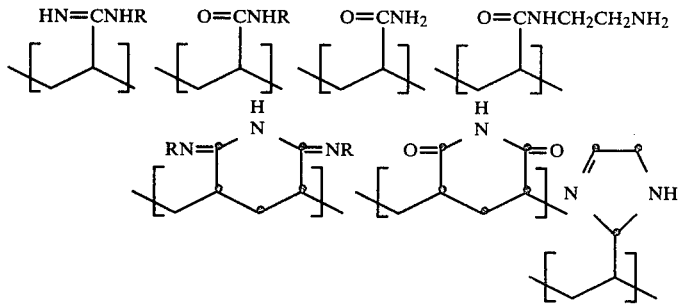

In accordance with the process used to synthesize the amine polymers of the present invention, certain reaction parameters should be observed in order to essentially prevent degradation, to substantially maintain the full length of the hydrocarbon backbone of the original nitrile polymer and obtain the maximum conversion of nitrile groups to adherence sites. This is accomplished by a short reaction time, use of a sulfur activator and moderate reaction temperatures. In a general reaction procedure the nitrile polymer, aminating agent and the sulfur activator are heated to a temperature of from 80° to no greater than 125° for about 10 minutes to no more than about five hours or until the reaction mixture is water soluble. In addition when using a higher average molecular weight nitrile polymer it is desirable to heat the nitrile polymer and aminating agent to the above temperature range and maintain them within that temperature range for a period of 15 to about 90 minutes before adding the sulfur activator. This preliminary heat treatment usually will provide a 10 to 30% increase in activity for the higher molecular weight amine polymers.

With regard to the superior dewatering activity of the amine polymers of the invention, it is essential that a sulfur activator be used in the condensation reaction. The data in Table I demonstrate this requirement. The polymers (preparations A, B, E, and F) formed from reaction of a nitrile polymer, aminating agent and water but without a sulfur activator have approximately five times less dewatering activity.

TABLE I

Comparison of amine polymers formed from different avg. Mw PAN nitrile polymers with similar polymers formed without use of a sulfur activator.

| Example or preparation | PAN[i] Mw (avg) X10[5] | % SA[ii] | DMPD[iii] PAN | character[iv] | dewatering activity[v] |
|---|---|---|---|---|---|
| 1A | 8.33 | 4 | 5 | FB | 1.24 |
| 2A | 8.33 | 4 | 9 | Salt | 1.26 |
| 2B | 17.7 | 4 | 5 | Salt | 0.74 |
| 2F | 12.8 | 4 | 5 | Salt | 1.33 |
| Prep. A | 17.7 | — | 4.2 | FB | 4.89 |
| Prep. B | 17.7 | — | 4.2 | Salt | 5.76 |
| Prep. E | 17.7 | — | 9.3 | FB | 5.00 |

TABLE I-continued

Comparison of amine polymers formed from different avg. Mw PAN nitrile polymers with similar polymers formed without use of a sulfur activator.

| Example or preparation | PAN[i] Mw (avg) X10$^5$ | % SA[ii] | DMPD[iii] PAN | character[iv] | dewatering activity[v] |
|---|---|---|---|---|---|
| Prep. F | 17.7 | — | 6 | FB | 5.94 |

[i] Average molecular weight of polyacrylonitrile (PAN)
[ii] Percent sulfur activator (SA)
[iii] Ratio of N,N-dimethylpropanediamine (DMPD) to polyacrylonitrile
[iv] Free base (FB) or hydrochloride salt (salt)
[v] R value specific resistance in the pressure dewatering test (cf. Example 23), a lower number indicates higher activity.

The progress of the reaction can be determined by any method known in the art including NMR, IR, chromatographic techniques and the like. It is usually followed by monitoring the reaction material to determine its water solubility. When the reaction material is water soluble, the reaction is complete. With analysis by any method, the reaction is usually complete within ten minutes to no more than five hours.

Work-up of the reaction mixture and isolation of the amine polymer may be accomplished using any manner known to those familiar with the art. The excess aminating agent may be removed by any of the usual methods including evaporation, vacuum distillation and the like. The amine polymer character after such treatment is a free base.

The amine polymer may be conditioned by contact with water at any time during its formation, workup and isolation storage or use. The presence of water directly in the reaction mixture, use of water during workup, exposure of the amine polymer to a wet atmosphere, storage of the amine polymer in aqueous solution, or contact of the amine polymer with water during its use as a dewaterant or flocculant are all effective conditioning methods. In usual practice the crude amine polymer is conditioned during workup by dissolving it in water after excess aminating agent has been removed, filtering and removing the water. It is believed that exposure to water by any of these methods converts some but not all of the initially formed amidine moieties pictured supra to amide moieties and tends to partially facilitate water solubility of the amine polymer.

If desired, the free base amine polymer can be converted to its mineral acid, organic acid or quaternary ammonium salt by methods known to those familiar with the art. The mineral acids appropriate for the salt formation include hydrochloric, hydrobromic, hydroiodic, sulfonic, sulfurous, sulfuric and phosphoric acids. The organic acids appropriate for salt formation include acetic, oxalic, tartaric, citric, glycolic, propionic, butyric, isobutyric, benzoic, and tosic acids. The alkylating agents appropriate for the formation of the quaternary ammonium salts include methyl, ethyl, propyl and isopropyl iodides, bromides and chlorides as well as the corresponding sulfates.

To form a mineral acid or organic acid salt, a simple acid-base neutralization is conducted. The free base amine polymer is dissolved in a suitable solvent and neutralized with an amount of acid which is equivalent to or in excess of the number of equivalents of amine groups present. The salt then may be precipitated or may be otherwise removed from the solvent system. It may also be used directly as a flocculating or dewatering agent.

The quaternary ammonium salt formation is conducted in a manner similar to the neutralization method described above. The free base amine polymer is dissolved in a suitable solvent and then the alkylating agent is added. Reaction is allowed to continue until substantially complete and in some instances, moderate heating may be employed to promote the reaction. The quaternary salt prepared in this manner may be used as a dewatering or flocculating agent directly in the dissolved form or after isolation as a solid product.

The utility of the invention is demonstrated by the various tests described in Examples 20 to 23 including the collodial clay flocculation test, the silted river water flocculation test, and the sewage sludge pressure dewatering and vacuum dewatering tests.

The performance of the amine polymers of the invention as dewatering agents is superior to the performance of several art recognized dewatering agents. Examples of the amine polymer tested as dewaterants in the pressure test (Test 1) of Example 23 have a range of activities from 0.47 (highest) to 2.86 (lowest) with a median of 1.26. The art recognized agents tested have a range from 1.41 to 7.50 with a median of 5.00. Thus for these comparative tests, the amine polymers of the invention are approximately 5 times more active as a group than the art recognized agents.

Of the art recognized agents tested in the pressure dewatering test, the best is Preparation C, polyvinylimidazoline, whose activity lies within the lowest active portion of the pressure test activity range observed for the amine polymers. In the vacuum dewatering test however, Preparation C is only $\frac{2}{3}$ as active as amine polymer 2D which has the lowest activity of the amine polymers tested in the vacuum dewatering test and has an activity within the low portion of the range observed for the pressure dewatering test. Thus these tests establish the superiority of the amine polymers of the invention over Preparation C and other art recognized agents with regard to dewatering activity.

The amine polymers sythesized using the mixture of N,N-(di-n-alkyl)-1,omega-n-alkanediamine and ethylenediamine have unexpected high activity as dewaterants. The data in Table 3, Example 23, show that an amine polymer made using a mixture of N,N-dimethyl-1,3-propanediamine and ethylenediamine exhibits about a 3 to 4 fold increase in dewatering activity over the amine polymers made using only an N,N-disubstituted alkanediamine, only an unsubstituted alkanediamine or a physical mixture of them. This extraordinary effect resulting from the use of a mixture of N,N-disubstituted and unsubstituted diamines as the aminating agent makes such amine polymers especially preferred embodiments of the invention.

Use of the amine polymers of the invention as dewaterants or flocculants in common sewage operations will accomplish treatment of waste such as organic compounds including humins, ulmins, and the like, clays, finely divided precipitates, heavy industrial waste such as mineral particulate, finely divided cellulose and vegetable waste, industrial chemicals of a particle nature and the like and silt and other natural material. It is the usual practice to add the flocculating or dewatering agent to the waste to cause the desired effect. The actual removal may be accomplished in any number of ways including pool settling, vacuum filtration, centrifugation or pressure filtration.

In accordance with the invention the amine polymer can flocculate or dewater wste in order to permit quick and efficient removal of the water from the waste solids.

The amine polymer may be used in its free base or its salt form and may be added to the waste as a solid or preferably as a concentrate in water. It is usual practice to treat each portion of waste with the amine polymer. A practical procedure is addition of an appropriate amount of a concentrate of the amine polymer in water to the waste to be treated followed by mechanical manipulation of the treated waste to remove the solids. Other methods of addition include onstream, direct addition, batch addition and addition with other clarification and purification agents. These methods are known to those familiar with the art.

To dewater aqueous suspensions of finely divided, suspended particulate matter or waste solids the amine polymer is added to the aqueous suspension at about 0.1 to 5 weight percent relative to the dry weight of the particulate matter present. The optimum amount required for treatment of a particular aqueous system will depend upon the identity of the waste solids present. Those familiar with the art will be able to empirically determine the optimum amount required for tests performed on an aliquot of the actual waste. For example, precipitation of the waste solids from the aliquot using differing amounts of amine polymer will usually reveal which concentration produces clarified water. After introduction of the amine polymer, the treated particulate matter and water may be separated by siphoning, filtering, centrifuging or by using other common techniques.

The amine polymers of the present invention are useful for dewatering or flocculating aqueous suspensions or mixtures of organic and inorganic materials or suspensions made entirely of organic material. Examples of such aqueous suspensions include industrial waste from dairies, canneries, chemical manufacturing waste, distillery waste, fermentation waste, waste from paper manufacturing plants, waste from dyeing plants, sewage suspensions such as any type of sludge derived from a sewage treatment plant including digested sludge, activated sludge, raw or primary sludge or mixtures thereof. In addition to the organic material present, the aqueous suspensions may also contain detergents and polymeric materials which will hinder the precipitation process. Modified methods for treatment in view of these factors are known to those familiar with the art.

The following examples are illustrative of the embodiments of the invention and are no way meant to limit its scope.

All temperatures mentioned both supra and infra are in degrees Centigrade and if not specified in the Examples are ambient temperatures.

The average molecular weight of the nitrile polymer is a viscosity derived weight. It is determined by measuring the intrinsic viscosity of the nitrile polymer in dimethyl formamide at 30° and using that value in the formula:intrinsic viscosity=$(2.09 \times 10^4)$ (avg. Mw)$^{0.75}$. The formula follows the method of T. Nonaka and H. Egawa, *Nippon Kagaku Kaishi* 9, 1771 (1974).

PREPARATION A

Dewatering Agent Polymer of Poly-Acrylonitrile, N,N-Dimethyl-1,3-propanediamine And Water At a Ratio of 1 to 4.2 to 0.83

This procedure follows that of U.S. Pat. No. 3,647,769. A mixture of 5.306 g (0.10 mol) of polyacrylonitrile of avg. Mw $1.77 \times 10^6$, 1.48 g of water (0.08 mol), and 43.51 g (0.424 mol) of technical grade N,N-dimethyl-1,3-propanediamine was heated at 121° with stirring under nitrogen for 16 hrs. The excess amine was removed in vacuo and the gummy orange residue was diluted with water and stirred. The undissolved material was removed by centrifugation and the supernatant was filtered, and freeze-dried to yield 9.43 g of the above titled free base agent polymer.

PREPARATION B

Hydrochloride Salt of the Agent Polymer of Preparation A

Following the method for salt formation given infra (Example 1), 4.71 g of the free base agent polymer of Preparation A was converted to 5.44 g of the above titled hydrochloride salt.

PREPARATION C

Dewatering Agent Polyvinylimidazoline

This procedure follows that of U.S. Pat. No. 3,046,139. Polyvinylimidazoline was prepared by mixing 60.10 g, (1.00 moles) technical grade ethylenediamine with 10.60 (0.20 moles) polyacrylonitrile (PVCN) (avg. nw 833,000) and 0.424 gm (8% w/w of PVCN) of sulfur in a 250 ml, 3-neck round bottom equipped with $N_2$, condenser and mechanical stirrer. This slurry was heated to 100° C. and held for 5 hrs. The solution was then cooled and the reaction residue precipitation by adding large excess of acetone (1800 ml). Then the solid yellow product was dissolved in water and freeze-dried to yield 13.6 gm of the above titled agent polyvinylimidazoline.

PREPARATION D

Dewatering Agent
Acrylamide-Methacryloxyethyltrimethyl Ammonium Methosulfate Copolymer This agent is commercially available and was purchased from a chemical supply house.

PREPARATION E

Dewatering Agent Polymer of Polyacrylonitrile, N,N-Dimethyl-1,3-Propanediamine And Water At A Molar Ratio of 1 to 9.3 to 0.11

This procedure follows that of U.S. Pat. No. 3,647,769. A mixture of 5.306 g (0.10 mol) of polyacrylonitrile of avg. Mw $1.77 \times 10^6$, 0.19 g (0.01 mol) of water and 95.36 g (0.93 mol) of technical grade N,N-dimethyl-1,3-propanediamine was heated with stirring under nitrogen at 125° for 17 hrs. After cooling to room temperature the clear, red solution was diluted with methanol and water and freeze-dried giving 9.70 g. of the above titled free base agent polymer.

PREPARATION F

Dewatering Agent Polymer of Polyacrylonitrile, N,N-Dimethyl-1,3-propanediamine And Water At A Molar Ratio of 1 to 6.0 to 0.2

This procedure follows that of U.S. Pat. No. 3,647,769. A mixture of 5.30 g (0.10 mol) of polyacrylonitrile of avg. Mw. $1.77 \times 10^6$, 0.36 g (0.02 mol) of water, and 60.87 g (0.60 mol) of technical grade N,N-dimethyl-1,3-diaminopropane was heated with stirring under nitrogen for 17 hrs. The excess amine was removed from the red solution in vacuo and the organic residue was dissolved in water, filtered, and freeze-dried to yield 10.36 g of the above titled free base agent polymer.

PREPARATION G

Physical Mixture of polyacrylonitrile (PVCN)/N,N-Dimethyl-1,3-propanediamine (DMPD) and polyacrylonitrile/Ethylenediamine (EDA)

A 1% w/w aqueous solution was prepared containing 0.5% w/w of the compound of Example 15A (DMPD aminated PVCN) and 0.5% w/w of the compound of Example 15I (EDA aminated PVCN). It was used for the comparative study of Example 23.

PREPARATION H

Physical Mixture of Preparation A and Preparation C(H)

A 1% w/w aqueous solution was prepared containing 0.5% w/w of the compound of Preparation C (EDA amination of PVCN) and 0.5% w/w of the compound of Preparation A (DMPD amination of PVCN). It was used for the comparative study of Example 23.

EXAMPLE 1

Amine Polymer of Polyacrylonitrile, N,N-Dimethyl-1,3-Propane Diamine and Sulfur (1A) and its Hydrochloride Salt (1B)

A mixture of 40.87 g (0.40 mol) of technical grade N,N-dimethyl-1,3-propanediamine (DMPD) and 5.306 g (0.10 mol of monomer units) of polyacrylonitrile (PAN) (avg. Mw $8.33 \times 10^5$) was heated at 110° with stirring under nitrogen for 2 hr. A solution of 0.212 g of sulfur as the sulfur activator (4 wt % based on polymer) in 10.18 g (0.10 mol) of DMPD was added and heating was continued until complete dissolution of the polymer resulted (3 hours). The extent of amination was monitored by removing aliquots periodically and diluting them with water. If reaction was complete, a clear red solution resulted. After this determination demonostrated complete reaction, the excess amine was recovered by vacuum distillation. Water was added to the dark, semi-solid product giving a deep red solution. The small amount of insoluble material was removed by filtration. The clarified solution was freeze-dried to yield 10.42 g of the above titled free base amine polymer 1A as a tan, fluffy, water-soluble solid. The characterizing data for (1A) are given in Table 3, infra.

The 10.42 g. the free base amine polymer was dissolved in 400 ml. of methanol containing 10 g. of anhydrous hydrogen chloride. The deep red solution was poured into 2400 ml. of rapidly stirring acetone which precipitated the hydrochloride as an orange granular solid.

It was collected by filtration, washed thoroughly with acetone, and vacuum-dried to give 12.78 g of above titled amine polymer hydrochloride salt (1B). The characterizing data for (1B) are given in Table 3 infra.

EXAMPLE 2

Additional Hydrochloride Salts of Amine Polymers of Polyacrylonitrile (PAN), N,N-Dimethyl-1,3-Propanediamine (DMPD) and Sulfur Activator (SA)

By employing the amounts of starting materials and procedures given in Example 1 and by substituting PAN's of varying avg molecular weights, different amounts of technical grade DMPD and different types or amounts of sulfur activator, the following amine polymers were prepared.

| Ex. No. | i yield | ii m.wt. | iii DMPD | iv SA | v Rx time |
|---|---|---|---|---|---|
| 2A | 10.1 | 8.33 | 91.9 g | * | 2.0 |
| 2B | 13.3 | 17.7 | * | * | 2.5 |
| 2C | 14.7 | 12.8 | * | 0.106 g S (2 wt. %) | 2.6 |
| 2D | 14.6 | 12.8 | * | 0.202 g thioacetic acid (1.5 wt %) | 3.1 |
| 2E | 14.6 | 12.8 | * | 0.126 g $CS_2$ (2 wt. %) | 3.3 |
| 2F | 15.8 | 12.8 | * | * | * |
| 2G | 11.9 | 12.8 | * | 0.414 g S (8 wt. %) | 2.5 |
| 2H | 13.2 | 17.7 | 102.2 g | * | 2.0+ |
| 2I | FB | 16.0 | * | * | 1.5 |
| 2J | FB | 16.0 | * | * | 3.5 |
| 2K | 13.45 | 8.46 | * | * | * |

The characterizing data for amines polymers 2A through 2K are given in Table 3 infra.
* Value is the same as that of Example 1.
+ Pre-reaction heat treatment at 90°-120° for 7½hr.
i Yield of HCL Salt (in g.)
ii Avg. Mw of PAN used ($\times 10^5$)
iii Amt. of DMPD used
iv Type and amt. of SA
v Reaction time after heat treat (hr.)

EXAMPLE 3

Amine Polymer of Equimolar Equivalents of Polyacrylonitrile, N,N-Dimethyl-1,3-Propenediamine and Sulfur (3)

To 5.30 g (3) (0.10 mol of monomer units) of polyacrylonitrile (avg Mw $1.77 \times 10^6$) was added 8.00 g (0.08 mol) of technical grade N,N-dimethyl-1,3-propanediamine and the mixture was heated at 110° for 2 hr. A solution of 0.212 g (4 wt %) of sulfur as the sulfur activator in 2.22 g (0.022 mol) of DMPD was added and heating at 110° was continued for 4 hr. After cooling, water was added directly to the reaction and the above titled free base amine polymer (3) was isolated by filtration of the aqueous solution followed by freeze drying to remove the water. The characterizing data are given in Table 3, infra.

EXAMPLE 4

Amine Polymer of Polyacrylonitrile, N-(3-aminopropyl)morpholine and Sulfur (4)

A mixture of 57.69 g (0.40 mol) of technical grade N-(3-aminopropyl)-morpholine (APM) and 5.306 g (0.10 mol of monomer units) of polyacrylonitrile (avg. Mw $1.6 \times 10^6$) was heated at 110° with stirring under nitrogen for 2 hr. A solution of 0.212 g of sulfur as the sulfur activator (4 wt.% based on nitrile polymer) in 14.43 g (0.10 mol) of wet APM was added and heating at 110° was continued for 4 hrs. Excess APM was recovered by vacuum distillation. Water was added to the residue, the mixture was filtered and 10.08 g of the above titled free base amine polymer (4) was isolated by freeze drying. The characterizing data are given in Table 3 infra.

EXAMPLE 5

Hydrochloride Salt of An Amine Polymer of Polyacrylonitrile, N,N-Dimethyl 1,2-Ethylenediamine and Sulfur (5)

A mixture of 35.20 g (0.40 mol) of technical grade N,N-dimethyl-1,2-ethylenediamine (DMED) and 5.306 g (0.10 mol monomer units) of polyacrylonitrile (avg. Mw $1.6 \times 10^6$) was heated at 110° with stirring under nitrogen for 2 hrs. A solution of 0.424 g of sulfur as the sulfur activator (8 wt.% based on nitrile polymer) in 8.80 g (0.10 mol) of DMED was added and heating was continued for 2 hrs. Excess DMED was recovered by vacuum distillation. Water was added to the residue and the mixture was filtered and freeze dried to yield 11.22 g of the free base amine polymer as an orange solid. Conversion to the hydrochloride salt following the procedure of Example 1 gave 14.16 g of the above titled amine polymer hydrochloride salt (5). The characterizing data for (5) are given in Table 3 infra.

EXAMPLE 6

Hydrochloride Salt of An Amine Polymer of Acrylonitrile-Ethyl Acrylate Copolymer, N,N-Dimethyl-1,3-Propanediamine and Sulfur (6)

A mixture of 51.09 g (0.50 mol) of technical grade N,N-dimethyl-1,3-propanediamine and 6.25 g of a copolymer of acrylonitrile and ethyl acrylate at a molar ratio of 4 to 1 and having an avg. Mw of $1.2 \times 10^6$ was heated at 110° stirring under nitrogen for 2 hrs. A 0.59 g portion of carbon disulfide as the sulfur activator (8 wt. % based on nitrile polymer) was added dropwise and heating was continued for 1 hr. Unreacted DMPD was recovered by vacuum distillation. Water was added to the residue, the yellow solution was filtered, and 10.15 g of the free base amine polymer was isolated by freeze drying. The above titled amine polymer hydrochloride salt (6) was prepared following the procedure of Example 2, yield 11.47 g. The characterizing data for (6) are given in Table 3 infra.

EXAMPLE 7

Additional Hydrochloride Salts of Amine Polymers of Acrylonitrile-Ethyl Acrylate Copolymer, N,N-Dimethyl-1,3-Propanediamine and Carbon Disulfide By employing the procedure of Example 6 and varying the amount of sulfur activator as shown below, the following amine polymer hydrochloride salts 7A through 7C were made.

| Hydrochloride Salt Number | Yield | amount of carbon disulfide used as the sulfur activator |
|---|---|---|
| 7A | 13.93 g | 1.24 g |
| 7B | 15.98 g | 2.47 g |
| 7C | 18.17 g | 4.95 g |

The characterizing data for amine polymer salts 7A thorugh 7C are given in Table 3, infra.

EXAMPLE 8

Hydrochloride Salt of An Amine Polymer of Acrylonitrile-Methyl Methacrylate Copolymer, N,N-Dimethyl-1,3-Propanediamine and Sulfur (8)

A mixture of 40.87 g (0.10 mol) of technical grade N,N-dimethyl-1,3-propanediamine and 5.80 g of a copolymer of acrylonitrile and methyl methacrylate at a ratio molar of 89.5 to 10.5 and having an avg. Mw of $1.2 \times 10^5$ was heated at 110° with stirring under nitrogen for 2 hrs. A solution of 0.232 g of sulfur as the sulfur activator in 10.18 g (0.10 mol) of DMDP was added and heating at 110° was continued for 1 hr. The work up, isolation and salt formation method of Example 1 was employed to give 12.65 g of the free base amine polymer which yielded 15.41 g of the above titled amine polymer hydrochloride salt (8). The characterizing data are given in Table 3 infra.

EXAMPLE 9

Hydrochloride Salt of An Amine Polymer of Acrylonitrile-Acrylic Acid Copolymer, N,N-Dimethyl-1,3-Propanediamine and Sulfur (9)

A mixture of 40.87 g (0.40 mol) of technical grade N,N-dimethyl-1,3-diaminopropane and 5.50 g of a copolymer of acrylonitrile and acrylic acid at a molar ratio of 9 to 1 was heated at 110° with stirring under nitrogen for 1 hr. A solution of 0.44 g of sulfur as the sulfur activator in 10.18 g (0.10 mol) of DMPD was added and heating at 110° was continued for 1 hr. The workup, isolation and salt formation method of Example 1 was employed to give 11.37 g of the free base amine polymer which yielded 14.57 g of the above titled amine polymer salt (9). The characterizing data for (9) are given in Table 3, infra.

EXAMPLE 10

Hydrochloride Salt of An Amine Polymer of Acrylonitrile-Acrylamide Copolymer, N,N-Dimethyl-1,3-Propanediamine and Sulfur (10)

A mixture of 5.49 g of a copolymer of acrylonitrile and acrylamide at a molar ratio of 9 to 1 and having an avg. Mw of $8.4 \times 10^5$ and 40.87 g (0.40 mol) of technical grade N,N-dimethyl-1,3-propanediamine was heated at 110° with stirring under nitrogen for 1 hr. A solution of 0.44 g of sulfur as the sulfur activator in 10.18 g (0.10 mol) of DMPD was added and heating at 110° was continued for 1 hr. The workup, isolation and salt formation method of Example 1 was employed to give 11.77 g of the free base amine polymer which yielded 14.11 g of the above titled amine polymer hydrochloride salt (1). The characterizing data for (10) are given in Table 3, infra.

EXAMPLE 11

Hydrochloride Salt of An Amine Polymer of Acrylonitrile-Ethyl Acrylate Copolymer, N,N-Dimethyl-1,3-Propanediamine and Mercaptoacetic Acid (11)

A mixture of 51.09 (0.50 mol) of technical grade N,N-dimethyl-1,3-propanediamine (DMPD) and 6.25 g of a copolymer of acrylonitrile and ethyl acrylate at a molar ratio of 4:1 and having an avg. Mw of $1.2 \times 10^6$ was heated at 110° with stirring under nitrogen for 2 hrs. A 1.44 g portion of mercaptoacetic acid as the sulfur activator was added dropwise and heating was continued for 3 hrs. Unreacted DMPD was recovered by vacuum distillation and 400 ml of methanol containing 10 g of anhydrous hydrogen chloride was added to the cooled residue. The yellow solution was filtered and poured slowly into 4500 ml of rapidly stirring acetone to precipitate the amine polymer hydrochloride salt. The yellow salt was collected by filtration, washed thoroughly with acetone, and vacuum-dried to yield 9.77 of the above titled amine polymer hydrochloride salt (11). The characterizing data for 11 are given in Table 3 infra.

EXAMPLE 12

Hydrochloride Salt Of An Amine Polymer Of Acrylonitrile-Ethyl Acrylate Copolymer, N,N-Dimethyl-1,3-Propanediamine and Thiophenol (12)

A mixture of 51.09 g (0.50 mol) of technical grade N,N-dimethyl-1,3-propanediamine and 6.25 g of a copolymer of acrylonitrile and ethyl acrylate at a molar ratio of 4:1 and having an avg. Mw of $1.2 \times 10^6$ was heated a 110° with stirring under nitrogen for 2 hrs. A 1.72 g portion of thiophenol as the sulfur activator was added dropwise and heating at 110° was continued for 5 hrs. Unreacted DMPD was recovered by vacuum distillation and 400 ml of methanol containing 10 g of anhydrous hydrogen chloride was added to the cooled residue. The yellow solution was filtered and poured slowly into 4500 ml. of rapidly stirring acetone to precipitate the hydrochloride salt. The yellow salt was collected by filtration, washed thoroughly with acetone and vacuum-dried to yield 9.69 of the above titled amine polymer hydrochloride salt (12). The characterizing data for (12) are given in Table 3 infra.

EXAMPLE 13

Hydrochloride Salt of An Amine Polymer of Polyacrylonitrile, N,N-Dimethyl-1,3-Propanediamine and Sulfur (13)

To a solution of 0.212 g of sulfur in 102.18 (1.0 m.) of technical grade N,N-dimethyl-1,3-diaminopropane was added 5.306 g (0.1 m of monomer units) of polyacrylonitrile of avg. molecular weight $1.77 \times 10^6$. The mixture was heated at 110° with stirring under nitrogen for 3 hours. The free-base amine polymer was isolated by dilution of the reaction with water followed by freeze drying. It was converted to the above titled hydrochloride salt as described in Example 1 to yield 11.23 g.

EXAMPLE 14

Hydrochloride Salt of a Polymer of Polyacrylonitrile, N,N-Dimethyl-1,3-Propanediamine and Sulfur (14)

A solution of 102.18 g (1.0 mol) of technical grade N,N-dimethyl-1,3-propanediamine 5.306 g (0.10 mol of monomer units) of polyacrylonitrile of avg. molecular weight $8.46 \times 10^5$ and 0.212 g of sulfur (4 wt % based on polymer) was heated at 110° for 3 hours. The free base was isolation by dilution of the reaction with water followed by freeze-drying. It was converted to the above titled hydrochloride salt as described in Example 1 to yield 13.21 g.

EXAMPLE 15

Amine Polymers of Polyacrylonitrile, Varying Ratios of N,N-Dimethyl-1,3-Propanediamine and Ethylenediamine and Sulfur Polyacrylonitrile (PVCN, avg. molecular weight $1.51 \times 10^5$) (30° C.) (0.10 mole of monomer units, 5.31 g) was slurried in the diamine (s) (0.70 mole total) containing 3% w/w water (based on diamine(s) in a 3-neck, 300 ml round bottom equipped with mechanical stirrer, modified Claissen distillation head and $N_2$ inlet. The white, fluid slurry was immersed in a 110° C. oil bath and held there for 2 hrs. After the heat treatment, a solution of sulfur (8 wt% of PVCN, 0.424 gm) in the diamine(s) (0.10 mole total) was added to the reactor. The diamines N,N dimethyl-1,3-propanediamine (DMPD) and ethylene diamine (EDA) were used in varying mole ratios as shown in Table A. The products were all isolated after the cessation of gas evolution (mostly ammonia) and the observance of water solubility of the product. The exception was 15B (0.70/0.10 mole ratio DMPD/EDA) which never became completely water soluble, although a small yield (ca 15%) of water soluble product was isolated.

TABLE A

| Example | Moles DMPD | Moles EDA | Rxn Time 110° C. | Wt. of Prod (g) | Insol. Material |
|---|---|---|---|---|---|
| 15A | 0.80 | 0.00 | 64 min. | 12,00 | none |
| 15B | 0.70 | 0.10 | 200 min | 1.87 | major product |
| 15C | 0.60 | 0.20 | 36 min. | 7.98 | heavy insoluble mass |
| 15D | 0.50 | 0.30 | 25 min. | 9.71 | moderate |
| 15E | 0.40 | 0.40 | 23 min. | 13.65 | moderate |
| 15F | 0.30 | 0.50 | 17 min. | 13.75 | moderate |
| 15G | 0.20 | 0.60 | 17 min. | 11.65 | moderate |
| 15H | 0.10 | 0.70 | 34 min. | 11.97 | moderate |
| 15I | 0.00 | 0.80 | 33 min. | 14.51 | moderate |

The excess diamines were removed by vacuum distillation (ca. 1–2 mm Hg) at 110° C. over 30–60 min. The solid yellow-red to light yellow products were dissolved in water (insoluble material removed via centrifugation) and the clear solutions freeze-dried to give the indicated yield of the above titled amine polymer. The characterizing data are given in Table 3 infra.

EXAMPLE 16

An Amine Polymer of Polyacrylonitrile, 60 mole percent N,N-Dimethyl-1,3-Propanediamine 40 mole percent Ethylenediamine and Sulfur (16)

A slurry of 18.03 gm (0.30 mole) ethylenediamine, 51.10 gm (0.50 mole) N,N-dimethyl-1,3-propanediamine, 2.17 gm (0.12 mole) water, 5.31 gm polyacrylonitrile (150,000 molecular weight) and 0.42 gm (8% w/w of PVCN) sulfur. The green-yellow slurry was heated to 90° under nitrogen for 23 min. at which point ammonia gas began to slowly evolve. After an additional 25 min. at 90° C., during which ammonia vigorously evolved and the product turned to a dark red/brown, water soluble solution, the excess amine was removed (90°, 5–8 mm Hg). The yellow-brown residue was dissolved in water and isolated by freeze-drying to give 11.75 g of the above titled amine polymer. The characterizing data are given in Table 3 infra.

EXAMPLE 17

An Amine Polymer of High Weight Polyacrylonitrile, Varying Ratios of N,N-Dimethyl-1,3-Propanediamine (DMPD) and Ethylenediamine (EDA) and Sulfur (17A, B and C)

Suspension-polymerized, polyacrylonitrile (avg. molecular weight $1.8 \times 10^6$ 5.21 g, 0.10 of mole of monomer units) was slurried in the diamine(s) (0.70 mole total) containing 3% w/w water (based on diamine). The white fluid slurry was immersed in a 110° C. oil bath and held there under nitrogen for 2 hrs. After this heat treatment a solution of sulphur (8% w/w of PVCN, 0.424 gm) in the diamine(s) (0.10 mole total) was added to the reactor.

The diamines DMPD and EDA were used singly and in an equimolar mixture. The DMPD and DMPD/EPA reactions became rubbery during the amination and required much longer reaction times than EDA to reach water solubility. Removal of excess diamine and product isolation was the same as Example 15 and yielded the above titled amine polymers (17A, Bond C). The characterizing data are listed on Table 3 infra.

TABLE 2

| Example | Moles DMPD | Moles EDA | Rxn Time 110° C. | Wt. Prod (g) | Insol. Material |
|---|---|---|---|---|---|
| 17A | 0.80 | 0.00 | 96 min. | 11.4 gm | none |
| 17B | 0.00 | 0.80 | 25 min. | 12.7 gm | none |
| 17C | 0.40 | 0.40 | 240 min. | 7.7 gm | mod. |

EXAMPLE 18

An Amine Polymer of a Copolymer of 25 weight percent Acrylonitrile and 75 weight percent Ethyl Acrylate, N,N-Dimethyl-1,3-Propanediamine (DMPD) and Ethylenediamine (EDA) and Sulfur The same procedure described in Example 15 was used to aminate a copolymer of acrylonitrile-ethyl acrylate which contained 25% w/w acrylonitrile ( [n]=1.07 in DMF at 30° C.). The 5.31 g portion of copolymer, used was soluble in the 0.7 mole total portion of the mixed diamine system 50 mole percent DMPD and 50 mole percent EDA. A 42 minute reaction at 110° C. yielded a water soluble product. After the excess diamines were removed by distillation, the product was dissolved in water and a small amount of insoluble material removed. The hazy aqueous solution was freeze-dried to yield 8.49 g of the above titled amine polymer 18. The characterizing data are listed on Table 3 infra.

EXAMPLE 19

An Amine Polymer of a Copolymer of 75 weight percent Acrylonitrile and 25 weight percent Ethyl Acrylate, N,N-Dimethyl-1,3-Propanediamine (DMPD) Ethylenediamine (EDA) and Sulfur (19)

Following the procedure described in Example 15, a copolymer of acrylonitrile-ethyl acrylate which contained 75% w/w acrylonitrile ( [n]=2.16 in DMF at 30° C.) was aminated. The amounts used were 5.31 g copolymer and 0.7 mole of a 50 mole percent DMPD, 50 mole percent EDA system. After the 2 hr heat treatment, the sulphur activator was added and after an additional 45 min. at 110° C., gas evolution has ceased and the product was water soluble. After removal of excess diamines, and addition of water a small amount of insoluble material was removed. The clear yellow solution was freeze-dried to yield 10.93 gm of the above titled amine polymer 19. The characterizing data are listed on Table 3 infra.

TABLE 3

Characterizing Data of the polyelectrolyte compositions of Examples 1 through 14

| Amine Polymer | Form | Microanalysis Data in % | | | | | U.V. Spectrum Lambda max in nm | IR Spectrum Characteristic peaks in cm$^{-1}$ |
|---|---|---|---|---|---|---|---|---|
| | | C | H | N | S | Cl | | |
| 1A | F.B. | 57.80 | 9.11 | 19.22 | 1.16 | — | — | 1640,1540,1445 |
| 1B | HCl salt | 41.97 | 8.11 | 14.40 | 0.82 | 19.54 | 253,321,389 | 1625,1530,1445 |
| 2A | HCl salt | 40.26 | 7.76 | 13.14 | 0.85 | 20.21 | 251,318,389 | 1630,1540,1450 |
| 2B | HCl salt | 44.58 | 7.86 | 14.32 | 0.81 | 20.20 | 249,314,389 | 1645,1545,1460 |
| 2C | HCl salt | 41.10 | 8.10 | 13.58 | 0.56 | 19.59 | 248,312,387 | 1645,1545,1452 |
| 2D | HCl salt | 43.14 | 7.73 | 14.11 | 0.46 | 21.48 | 251,315,386 | 1640,1535,1460 |
| 2E | HCl salt | 42.73 | 7.29 | 14.25 | 0.42 | 19.47 | 251,315,385 | 1645,1545,1465 |
| 2F | HCl salt | 42.25 | 8.05 | 14.69 | 1.94 | 19.83 | — | — |
| 2G | HCl salt | 43.33 | 7.50 | 14.05 | 1.94 | 20.41 | 252,320,390 | 1645,1545,1455 |
| 2H | HCl salt | 40.87 | 7.18 | 13.29 | 0.90 | 19.50 | 250,320,388 | 1650,1550,1470 |
| 2I | F.B. | 54.42 | 8.58 | 17.20 | 1.40 | — | 250,313,380 | 1640,1540,1445 |
| 2J | F.B. | 56.83 | 8.76 | 18.83 | 1.43 | — | 254,320,390 | 1660,1530,1460 |
| 2K | HCl salt | 43.33 | 7.45 | 14.38 | 0.73 | 24.89 | 249,318,388 | 1650,1550,1460 |
| 3 | F.B. | 57.72 | 9.10 | 18.12 | 2.83 | — | — | 1640,1550,1450 |
| 4 | F.B. | 56.78 | 8.10 | 15.09 | 1.25 | — | 253,320,390 | 1640,1530,1450 |
| 5 | HCl salt | 40.55 | 7.48 | 14.55 | 1.56 | 19.85 | 245,310,389 | 1650,1540,1450 |
| 6 | HCl salt | 42.92 | 7.52 | 12.94 | 1.48 | 18.98 | 253,315,388 | 1660,1540,1470 |
| 7A | HCl salt | 44.29 | 7.86 | 14.34 | 1.79 | 19.13 | 255,316,387 | 1640,1540,1460 |
| 7B | HCl salt | 42.74 | 7.77 | 13.47 | 2.84 | 18.16 | 262 | 1650,1540,1460 |
| 7C | HCl salt | 40.86 | 8.54 | 13.27 | 4.88 | 18.97 | 259,386 | 1640,1540,1460 |
| 8 | HCl salt | 44.03 | 7.63 | 13.94 | 1.14 | 20.12 | 252,318,388 | 1640,1540,1460 |
| 9 | HCl salt | 43.11 | 7.74 | 13.97 | 1.98 | 20.33 | 252,315,389 | — |
| 10 | HCl salt | 42.89 | 7.19 | 13.64 | 1.82 | 17.35 | 260,322,389 | — |
| 11 | HCl salt | 46.81 | 8.14 | 14.48 | 0.27 | 19.01 | 266,316,388 | — |
| 12 | HCl salt | 45.17 | 7.78 | 14.25 | 1.29 | 17.88 | 268,321,390 | — |
| 15A | F.B. | 54.53 | 9.06 | 17.94 | 2.39 | | 253,317,388 | 1640,1545,1450 |
| 15B | F.B. | 47.43 | 7.83 | 17.57 | 5.56 | | 226,305,380 | 1640,1600,1560,1450 |
| 15C | F.B. | 52.14 | 8.35 | 20.79 | 2.49 | | 309,386,449 | 1640,1600,1440,1380 |
| 15D | F.B. | 50.62 | 8.46 | 21.54 | 1.98 | | 310,383,448 | 1640,1600,1460,1380 |
| 15E | F.B. | 50.61 | 8.77 | 22.29 | 1.63 | | 309,333,373 | 1600,1570,1460,1280 |
| 15F | F.B. | 50.51 | 9.02 | 22.07 | 1.50 | | — | 1640,1590,1460,1380 |
| 15G | F.B. | 51.28 | 8.35 | 19.66 | 1.60 | | — | 1580,1470,1380 |
| 15H | F.B. | 49.37 | 8.41 | 24.19 | 2.00 | | — | 1600,1480,1380 |
| 15I | F.B. | 49.63 | 8.40 | 25.81 | 1.19 | | 228,303 | 1610,1480,1290 |
| 16 | F.B. | 48.09 | 8.74 | 20.00 | 2.71 | | — | 1700,1640,1600,1460,1290 |
| 17A | F.B. | 49.89 | 8.81 | 15.88 | 2.33 | | — | 1640,1540,1440,1380 |
| 17B | F.B. | 50.09 | 8.71 | 23.77 | 1.47 | | — | 1600,1490,1380 |
| 17C | F.B. | 47.94 | 8.35 | 20.41 | 2.47 | | 308,372 | 1600,1450 |
| 18 | F.B. | 49.56 | 7.85 | 14.30 | 3.09 | | — | 1720,1660,1630,1560 |
| 19 | F.B. | 41.81 | 7.93 | 19.05 | 2.48 | | — | 1600,1450,1280 |

EXAMPLE 20

Clay Flocculation Test of Several Amine Polymers And An Art Recognized Flocculation Agent Six Beakers containing 800 g of 2500 ppm of suspended kaolin clay (hydride "R") were placed in a Phipps and Bird gang stirrer and agitated at 100 rpm. Aqueous solutions (8 ml) at six different concentrations of the representative amine polymer or known flocculation agent to be tested were added to the six beakers. Stirring at 100 rpm was continued for 5 min. followed by a 10 min. period of stirring at 30 rpm. Settling without stirring for 3 min. allowed sedimentation of the flocculated clay. After removing the supernatant liquid from each beaker, its turbidity was measured using a Hach Turbidimeter apparatus according to the method of Vesilind (see reference, Example 23). The results obtained for the amine polymers of Examples 2A and 2B and for the art recognized flocculation agent, Preparation C are listed infra.

Flocculation Activity at 2500 ppm Suspended Clay

| Example or Preparation tested | Turbidity Readings (NTU) vs. Concentration (ppm) | | | | | |
|---|---|---|---|---|---|---|
| | 0.25 | 0.50 | 1.0 | 2.0 | 4.0 | 8.0 |
| Example 2A | 1300 | 210 | 69 | 29 | 71 | 300 |
| Example 2B | 1400 | 480 | 93 | 20 | 23 | 140 |
| Prep. C | 2950 | 1200 | 645 | 105 | 27 | 105 |

Turbidity of blank (no polymer) 2800 NTU

EXAMPLE 21

Clay Flocculation Test Using An Additional Flocculation Aid

The flocculation test of Example 20 was repeated using 100 ppm suspended kaolin clay. Prior to adding the amine polymer or known flocculation agent to be tested, 12 ppm of bentonite clay was added as a coagulation aid. The results obtained for the amine polymers of Examples 2A, 2B, 2G, 15E and 17C and for the art recognized flocculation agents, Preparations C and D are listed infra.

Flocculation Activity at 100 ppm Suspended Clay

| Example or Preparation Tested | Turbidity Readings (NTU) vs. Concentration (ppm) | | | | |
|---|---|---|---|---|---|
| | 0.3 | 0.6 | 0.9 | 1.2 | 1.5 |
| Example 2A | 54 | 12 | 17 | 42 | 62 |
| Example 2B | 110 | 110 | 26 | 12 | 17 |
| Example 2G | 105 | 14 | 23 | 14 | 110 |
| Example 15E | 110 | 42 | 16 | 12 | 62 |
| Example 17C | 110 | 110 | 22 | 15 | 8 |
| Prep. C | 105 | 18 | 10 | 14 | 22 |
| Prep. D | 110 | 110 | 110 | 110 | 110 |

Turbidity at blank (no polymer) 110 NTU

EXAMPLE 22

River Water Slit Flocculation

The flocculation test of Example 20 was repeated with water samples from the Missouri and Monogahela Rivers to demonstrate flocculation of river water silt. The results obtained for the amine polymer of Example 2A and for the art recognized flocculation agent, Preparation C are listed infra.

| Missouri River Preparation or Example | Turbidity Readings (NTU) vs Concentration (ppm) | | | | |
|---|---|---|---|---|---|
| | 0.1 | 0.2 | 0.3 | 0.4 | 0.5 |
| Example 2A | 3.5 | 2.9 | 2.5 | 2.6 | 4.2 |
| Prep. C | 8.0 | 5.3 | 3.2 | 2.6 | 2.8 |
| Turbidity of blank (no polymer) 19 NTU | | | | | |
| Monogahela River | | | | | |
| Example 2A | 3.2 | 2.2 | 2.6 | 1.8 | 2.0 |
| Prep. C. | 8.4 | 5.6 | 3.7 | 3.5 | 3.5 |

Turbidity of blank (no polymer) 15 NTU

EXAMPLE 23

Sludge Dewatering Test of Several Amine Polymers and Several Art Recognized Dewatering Agents Test 1, Pressure Filter Test, Specific Resistance A 100 g portion anerobically digested municipal sewage test sludge was weighed into a beaker. The amount of amine polymer or art recognized dewatering agent to be tested was calculated as 1.5% of total sludge solids and was added to the sludge. The mixture was stirred for 60 sec. and poured into a pressure filter apparatus containing a 0.22 micron pore filter. The pressure was adjusted to 10 psi with compressed air. A timer was started and the volume of filtrate collected as a function of time was recorded. The specific resistance in m/kg. was computed as described by P.A. Vesilind, in "Treatment and Disposal of Wastewater Sludges", Ann Arbor Science Publisher, Inc., Ann Arbor, Mich. 1974. The results using this test are listed infra. The lower the specific resistance the better the dewatering capacity of the amine polymer or art recognized dewatering agent.

Test 2, Vacuum Filtration Test, Yield Value

A Buchner funnel vacuum apparatus was employed to measure dewatering activity. Anaerobically digested municipal sewage test sludge was treated with an amount of amine polymer or art recognized dewatering agent calculated to be 1.5% by weight of the total sludge solids as described above. The treated sludge was poured into a Buchner funnel containing a #2 "Whatman" filter paper. A vacuum measuring 12–13 cm. Hg was applied and a timer was started. The volume of filtrate collected as a function of time was recorded. At the end of the filtration the weight of the total solids of the sludge cake was determined. The yield value in lbs/ft$^2$/hr was calculated using the method of Vesilind, see citation supra. The results obtained using this test are listed infra. The higher the yield value the better the dewatering capacity of the art recognized dewatering agent or amine polymer.

Test 3 Vacuum Filtration Test, Specific Resistance

A vacuum test using a Buchner funnel was also used to determine the specific resistance of several amine polymers synthesized using a mixture of diamine as the aminating agent.

A 100 g portion of the anerobically digested municipal sewage sludge was syringed into a beaker and treated with about 2% dose of amine polymer as measured in Test 1. After 60 sec. of stirring (spatula), the solidified sludge was filtered on a Buchner funnel (Whatman #2 paper) using a vacuum measuring 12–13 inches of Hg. A log of filtrate volume (ca. every 10 cc)

as a function of time was recorded. Also the filtrate volume after 60 sec. was recorded. When the sludge was completely dewatered (vacuum break), the weight of the total solids was obtained for the sludge cake after drying in a microwave oven. Cumulative seconds per ml of filtrate was plotted at each volume of filtrate recorded and the slope calculated at a point usually between 50 and 80 ml of filtrate. The specific resistance was calculated using the method of Vesilund, see citation supra. The results using this test are listed infra. The lower the specific resistance, the better the dewatering capacity of the test substance.

In general the measurement of dewatering capacity of an example of an amine polymer varies with the heterogenous nature of the sewage sludge tested. Some sludges will give higher and others will give lower values. Thus an overall qualitative comparison with respect to a standard or ranking relative to a standard irrespective of sludge identity and a quantitative comparison using a single sample of sewage sludge, are accurate but direct comparisons of tests run on different sludges, for example Tests 1 and 3, are not.

| Results of Test 1 and Test 2 | | |
|---|---|---|
| Example or Preparation Tested | Test 1 - Pressure Test Specific Resistance ($\times 10^{12}$ m/kg) | Test 2 - Vacuum Test Yield Value (lbs/ft$^2$/hr) |
| 1A | 1.25 | — |
| 1B | 1.24 | — |
| 2A | 0.26 | — |
| 2B | 0.74 | 1.0 |
| 2C | 2.01 | — |
| 2D | 1.99 | 0.93 |
| 2E | 1.48 | — |
| 2F | 1.33 | — |
| 2G | 0.47 | 1.14 |
| 2H | 1.12 | — |
| 2I | 1.72 | — |
| 2J | 1.44 | — |
| 2K | 2.58 | — |
| 5 | — | 1.96 |
| 6 | 0.47 | 1.44 |
| 7A | 0.67 | 1.23 |
| 7B | 0.76 | 1.09 |
| 9 | 1.07 | 1.27 |
| 10 | 0.83 | — |
| 13 | 1.43 | — |
| 14 | 2.86 | — |
| Prep. A | 4.89 | — |
| Prep. B | 5.16 | — |
| Prep. C | 1.41 | 0.67 |
| Prep. D | 7.50 | — |
| Prep. E | 5.00 | — |
| Prep. F | 5.94 | — |

Blank (no polymer) 127

| Results of Test 3 | | | |
|---|---|---|---|
| Example or Preparation | Specific Resistance $\times 10^{12a}$ | % Dosage$^b$ | Sludge |
| 13 | 8.45 | 1.75 | A |
| 15A | 8.45 | 2.0 | A |
| 15C | 12.86 | 4.0 | A |
| 15D | 3.85 | 2.25 | A |
| 15E | 5.14 | 1.50 | A |
| 15F | 4.59 | 2.0 | A |
| 15G | 6.06 | 1.75 | A |
| 15H | 7.71 | 2.0 | A |
| 15I | 8.08 | 2.25 | A |
| Prep C | 40.0 | 2.0 | A |
| Comparison of Physical Mixtures and the Amine Polymer using 2 diamines | | | |
| 15A | 6.34 | 2.0 | B |
| 15I | 6.82 | 2.0 | B |
| 15E | 2.01 | 2.25 | B |
| Prep G | 6.82 | 2.0 | B |
| Prep C | 15.7 | 2.0 | B |
| Prep A | 15.7 | 2.0 | B |
| Prep H | 20.46 | 2.0 | B |
| Amine Polymer Formed Using High MW Nitrile Polymer | | | |
| 17A | 6.45 | 2.0 | C |
| 17B | 5.53 | 2.25 | C |
| 17C | 1.58 | 2.0 | C |
| Prep C | 13.2 | 1.75 | C |
| 13 | 3.55 | 2.50 | C |
| Copolymers | | | |
| 19 | 2.32 | 2.25 | D |
| 15I | 2.44 | 2.5 | D |
| Prep C | 18.8 | 2.0 | D |
| 13 | 5.01 | 2.0 | D |

$^a$vacuum filter test
$^b$data at optimum dosage

We claim:

1. A water-soluble amine polymer comprising: a water-conditioned condensation product of a nitrile polymer with from 1 to 20 molar equivalents of an aminating agent per molar equivalent of nitrile groups in the nitrile polymer, and from at least about 1 weight percent of a sulfur activator which is measured by the proportion of contained sulfur present in the activator relative to the weight of the nitrile polymer, wherein, the nitrile polymer is selected from polyacrylonitrile having an average molecular weight within a range of from about 150 thousand to about 5 million or a copolymer having an average molecular weight within a range of from about 50 thousand to about 3 million which is composed of at least about 30 mole percent acrylonitrile monomer with the remainder being an ethylenically unsaturated comonomer selected from acrylic acid, alkyl acrylate, methacrylic acid, alkyl methacrylate, methacrylonitrile, acrylamide, N,N-dialkylacrylamide, methacrylamide, N,N-dialkylmethacrylamide, alkyl vinyl ketone, styrene, and alkyl crotonate, each alkyl substituent being from one to four carbon atoms in length, the aminating agent is a mixture of about 30 to about 70 mole percent N,N-(di-n-alkyl)-1,omega-n-alkanediamine and about 70 to about 30 mole percent ethylenediamine, each alkyl group being 1 to 5 carbons in length and the n-alkane group being 2 to 6 carbons in length, and the sulfur activator is selected from sulfur, hydrogen sulfide, carbon disulfide, mercaptoacetic acid, thoacetic acid or thioacetamide.

2. A mineral acid, organic acid or quaternary ammonium salt of an amine polymer of claim 1.

3. An amine polymer of claim 1 wherein:
the nitrile polymer is polyacrylonitrile or a copolymer of acrylonitrile and acrylic acid, ethyl acrylate, methyl methacrylate or acrylamide; and
the aminating agent is a mixture of N,N-dimethyl-1,3-propanediamine and ethylenediamine.

4. An amine polymer of claim 1 formed from polyacrylonitrile, 5 to 8 molar equivalents of a mixture of about 45 to 60 mole percent N,N-dimethyl-1,3-propanediamine and about 55 to 40 mole percent ethylenediamine, and 4 to 10 weight percent sulfur.

* * * * *